(12) United States Patent
Keller (10) Patent No.: US 11,826,896 B2
(45) Date of Patent: Nov. 28, 2023

(54) POWER TOOL AND BATTERY SUPPORT RACKS AND METHODS OF MANUFACTURING

(71) Applicant: Matthias Keller, Maineville, OH (US)

(72) Inventor: Matthias Keller, Maineville, OH (US)

(*) Notice: Subject to any disclaimer, the term of this patent is extended or adjusted under 35 U.S.C. 154(b) by 0 days.

(21) Appl. No.: 17/550,645

(22) Filed: Dec. 14, 2021

(65) Prior Publication Data

US 2023/0182281 A1 Jun. 15, 2023

(51) Int. Cl.
*B25H 3/04* (2006.01)
*B33Y 80/00* (2015.01)
*B25H 3/00* (2006.01)

(52) U.S. Cl.
CPC .............. *B25H 3/04* (2013.01); *B25H 3/006* (2013.01); *B33Y 80/00* (2014.12)

(58) Field of Classification Search
CPC ......... B25H 3/04; B25H 3/006; B33Y 80/00; A47F 5/08; A47F 7/0021; A47F 7/0028
USPC ........................ 211/70.6, 66, 70.8, 75, 87.01
See application file for complete search history.

(56) References Cited

U.S. PATENT DOCUMENTS

| | | | |
|---|---|---|---|
| D65,357 S * | 7/1924 | Strand | D6/528 |
| D175,455 S * | 8/1955 | Bartleman | D6/572 |
| 2,754,008 A * | 7/1956 | Culver | A47G 21/14 |
| | | | 211/70.1 |
| 2,924,410 A * | 2/1960 | Davis | A47G 21/14 |
| | | | 211/70.1 |
| 3,187,902 A * | 6/1965 | Nelson | B25H 3/04 |
| | | | 248/220.42 |
| 3,792,775 A * | 2/1974 | Riddle | A01K 97/10 |
| | | | 224/406 |
| 4,446,972 A * | 5/1984 | Sussman | A47G 29/08 |
| | | | 211/60.1 |

(Continued)

FOREIGN PATENT DOCUMENTS

| | | |
|---|---|---|
| GB | 2347884 A | 9/2000 |
| WO | 202037371 A1 | 2/2020 |

OTHER PUBLICATIONS amazon.com, "BEHR-ENGR Thick Plastic Power Tool Organizer—Wall Mountable, Drill Storage, Charging Station Shelf (Drill Rack w/Shelf)" visited Dec. 13, 2021 at https://www.amazon.com/BEHR-ENGR-Thick-Plastic-Power-Organizer/dp/B08Y7RS657 (7 pages).

*Primary Examiner* — Jennifer E. Novosad
(74) *Attorney, Agent, or Firm* — Wood Herron & Evans LLP (57) ABSTRACT

A support rack and method of manufacture thereof are provided for retaining a power hand tool or a battery pack on a wall surface. The support rack when configured for storing a power hand tool includes a mounting panel for connection to the wall surface, a support panel that extends from the mounting panel, and at least one projecting structure that extends upwardly from the support panel. The projecting structure is customized in shape and size to releasably engage in a close frictional fit with at least one corresponding interface element (aperture or slot) provided on the power hand tool. The support rack is integrally formed as a unitary piece from a plastic material and thus includes no metallic or conductive components configured to provide power or electrical charging to the power hand tool (or battery pack), thereby providing a reliable physical support for same.

18 Claims, 5 Drawing Sheets

(56) References Cited

U.S. PATENT DOCUMENTS

| | | | |
|---|---|---|---|
| 4,653,637 A | 3/1987 | Wallace | |
| D309,687 S * | 8/1990 | Embree | D6/552 |
| D312,382 S | 11/1990 | Ryll | |
| 5,050,733 A | 9/1991 | Brennan | |
| 5,485,931 A * | 1/1996 | Barr, Jr. | A47F 5/08 |
| | | | 248/314 |
| 5,641,079 A * | 6/1997 | Schmidt | A47F 5/0823 |
| | | | 211/104 |
| 5,669,515 A * | 9/1997 | Tisbo | B25H 3/04 |
| | | | 211/70.6 |
| 5,678,700 A * | 10/1997 | Crosson, Jr. | A01K 97/10 |
| | | | 211/60.1 |
| D392,144 S * | 3/1998 | Vogler | D6/574 |
| D394,775 S * | 6/1998 | Anderson | D6/574 |
| 5,843,388 A * | 12/1998 | Arroyo | A61L 2/26 |
| | | | 206/370 |
| D412,421 S * | 8/1999 | Belokin | D6/574 |
| 5,944,294 A | 8/1999 | Baer | |
| D431,407 S * | 10/2000 | Sorensen | D6/574 |
| D458,070 S * | 6/2002 | Bennett | D6/567 |
| 6,425,489 B1 * | 7/2002 | Cunningham | B25H 3/003 |
| | | | 211/70.6 |
| 6,520,350 B1 | 2/2003 | Smith | |
| 6,769,553 B1 * | 8/2004 | Hurt | A47F 7/0028 |
| | | | 211/60.1 |
| 6,796,440 B2 * | 9/2004 | Wang | A47F 7/0028 |
| | | | 211/183 |
| 6,877,619 B1 * | 4/2005 | Han | A47K 1/09 |
| | | | D6/528 |
| 6,918,495 B1 * | 7/2005 | Hoy | A47K 1/09 |
| | | | 211/66 |
| 7,036,668 B2 * | 5/2006 | Udy | B25H 3/04 |
| | | | 211/60.1 |
| D524,146 S * | 7/2006 | Jolson | D6/567 |
| 7,077,275 B2 * | 7/2006 | Kao | B65D 73/0021 |
| | | | 211/90.04 |
| D532,679 S | 11/2006 | Ignagni | |
| 7,185,770 B1 * | 3/2007 | Roten | A47B 81/00 |
| | | | 211/70.6 |
| D578,855 S | 10/2008 | Meyers et al. | |
| 7,506,770 B2 * | 3/2009 | Rief | E04H 4/14 |
| | | | 211/70.6 |
| 7,510,092 B2 | 3/2009 | Sholem | |
| D590,240 S | 4/2009 | Hutter, III | |
| 7,527,156 B2 | 5/2009 | Wisnoski et al. | |
| 7,721,899 B2 * | 5/2010 | Lambert | A47K 1/09 |
| | | | 211/13.1 |
| 7,721,900 B2 * | 5/2010 | Waterman | A47F 7/0028 |
| | | | 211/89.01 |
| 7,980,400 B2 | 7/2011 | Kao | |
| D735,023 S | 7/2015 | Baldwin et al. | |
| D782,265 S | 3/2017 | Szucs et al. | |
| 9,597,791 B2 * | 3/2017 | Neal | A47F 5/0823 |
| D808,237 S | 1/2018 | Tatom | |
| D863,017 S * | 10/2019 | Mefferd | D8/71 |
| 10,476,284 B2 | 11/2019 | Suzuki et al. | |
| D898,551 S | 10/2020 | Landgren | |
| D898,552 S | 10/2020 | Landgren | |
| D899,882 S | 10/2020 | Folger et al. | |
| D915,856 S | 4/2021 | Chen | |
| 2001/0054593 A1 * | 12/2001 | Grassman | A47F 7/0028 |
| | | | 211/90.01 |
| 2003/0116516 A1 * | 6/2003 | Belokin | A47F 7/0028 |
| | | | 211/70.1 |
| 2004/0079716 A1 * | 4/2004 | Hester | A47K 1/09 |
| | | | 211/89.01 |
| 2004/0144739 A1 * | 7/2004 | Marek | B25H 3/04 |
| | | | 211/89.01 |
| 2006/0037920 A1 * | 2/2006 | Baranya | A47B 81/005 |
| | | | 211/70.6 |
| 2006/0102569 A1 * | 5/2006 | Laga | A47F 5/0807 |
| | | | 211/70.6 |
| 2007/0210021 A1 * | 9/2007 | Whitehead | B25H 3/04 |
| | | | 211/70.6 |
| 2011/0114580 A1 * | 5/2011 | Chen | B25H 3/04 |
| | | | 211/70.6 |
| 2013/0032555 A1 * | 2/2013 | Gaines, VII | B25H 3/04 |
| | | | 211/70.6 |
| 2017/0210003 A1 | 7/2017 | Kopans | |
| 2019/0291264 A1 * | 9/2019 | Mefferd | B25H 3/003 |

\* cited by examiner

POWER TOOL AND BATTERY SUPPORT RACKS AND METHODS OF MANUFACTURING

TECHNICAL FIELD

The invention relates generally to organization and storage devices, and more specifically relates to support structures for mounting handheld power tools and their associated battery packs on a generally vertical wall surface.

BACKGROUND

Handheld power tools that are battery-powered are present in almost every household and in many businesses. These power tools can include anything from cordless drills and sanders to lawn care devices (e.g., leaf blowers and the like). Such power tools provide the convenience of working wirelessly throughout a house or building and/or the surroundings outside same. It is typical for certain brands and manufacturers of such power tools to use a unique battery pack or base that can work with many different types of power tools, as tool manufacturers realized that operators will want battery power for multiple types of tools, but only one tool is typically used at a time by the operator. As a result, battery packs can be readily moved between charging stations and any of the power tools that may need powered at that time by the battery pack(s).

Also as a result, it is typical for owners of these sets of power tools to have extra battery packs on hand for switching into service when a battery pack on a power tool is exhausted of its electrical energy. Especially with spare or additional battery packs, these elements must be stored separately from the power tools because the power tools are often engaged with other battery packs or chargers. Furthermore, it is often the case that the additional battery packs cannot just be stored on chargers because such chargers are space-consuming and only charge one or two battery packs at a time. It is desirable to have good organization for storing such elements because tool storage spaces tend to be easily prone to disorganization and messiness, which can make it more time-consuming and difficult to find and replace a battery pack when needed during work with the power tools. Moreover, battery packs and tools are more prone to accidental damages and/or loss when not stored in an organized manner.

Present solutions for assisting with storage of tools are not well-configured for these types of handheld power tools and their battery packs. British Patent No. GB 2 347 884 describes a device for suspending or attaching a hand tool, but such a device has multiple connecting parts and locking components that are complex to manufacture and only secure a single device, in any event. Another prior design is described in International PCT Patent Application Publication No. WO2020/037371, but this holder device is only configured to receive one or more batteries. To this end, the holder in '371 is not configured to provide storage solutions relevant to storing the power hand tools themselves, and the holder seemingly must also be mounted horizontally and/or include locking structures which limit the use conditions for the holder while also increasing manufacturing complexity. Furthermore, many other commercially-available designs also include integrated charging capabilities which would then require further connection to an external power supply to be fully functional. Each of these prior designs therefore places significant limits on how they can be used, which reduces the likelihood of encouraging and achieving the desired organization of tools and battery packs and protection from accidental damages of these.

It would therefore be desirable to provide a support rack that better supports and organizes power hand tools or battery packs, while providing a simplified construction and better use configurations, including for wall-mounted organization of same.

SUMMARY

These and other technical problems are addressed by the tool support rack in accordance with embodiments of this invention. The tool support rack is configured to retain a power hand tool on a wall surface. In a first set of embodiments, the support rack includes a mounting panel, a support panel, and at least one projecting structure. The mounting panel is configured to be positioned in engagement with the wall surface, and the mounting panel includes at least one fastener aperture sized to receive a fastening element that removably couples the mounting panel to the wall surface. The support panel is connected to and extends transversely from the mounting panel, with the support panel including an upper surface and a lower surface. The projecting structure extends transversely and upwardly from the upper surface of the support panel. The projecting structure is customized in shape and size to releasably engage in a frictional fit with at least one corresponding interface aperture or slot provided on the power hand tool. Advantageously, the support rack includes no metallic or conductive components configured to provide power or electric charging to the power hand tool. As such, the support rack provides only a physical support for the power hand tool on the wall surface. The support rack is easy and inexpensive to manufacture and customized for a certain type (or brand) of power hand tool so that owners of such power hand tools can better store and organize tools without filling up shelf space or other surfaces that are better used for other types of tools and devices.

In one embodiment, each of the mounting panel and the support panel is a planar panel. The support panel extends perpendicular to the mounting panel in such an embodiment, and such that the support panel is oriented horizontally when the support panel is secured to the wall surface, which is generally vertical in orientation.

In another embodiment, the mounting panel defines a U-shaped construction with mounting tabs extending vertically above a remainder of the mounting panel on opposite lateral ends of the mounting panel. Each of the mounting tabs includes one of the fastener apertures, which results in a plurality of fasteners being used to secure the tool support rack to the wall surface.

In a further embodiment, the tool support rack is formed from and consists of a plastic material only. For example, all of the mounting panel, the support panel, and the projecting structure are formed integrally as a unitary piece from the plastic material. The plastic material may be formed by additive manufacturing methods such as 3D printing, or alternatively, injection molding processes.

In yet another embodiment, the mounting panel and the support panel define a thickness and size configured to support a full weight of the power hand tool when the power hand tool is engaged in the frictional fit with the projecting structure. In other embodiments, a plurality of the tool support racks may be combined in use to support larger tools having multiple interface elements, although it is preferred to support the power hand tool with a single support rack if possible.

In one embodiment, the projecting structure further includes an interface post extending upwardly from the support panel. The interface post may be higher in height than the mounting panel, in some embodiments. The interface post includes a shaped periphery sized to frictionally engage and fit within a receptacle aperture on the power hand tool. To this end, the interface post closely simulates the shape and size of a battery interface on a battery pack designed to engage with the receptacle aperture of the power hand tool. The shaped periphery of the interface post generally remains consistent along a height of the interface post except at an upper free end of the interface post. In this regard, the interface post further includes slots cutaway from the shaped periphery adjacent the upper free end to simulate charging interface terminals on the battery pack designed to engage with the power hand tool.

In related embodiments, the projecting structure can further include a pair of elongated rail-shaped projections having a height less than the height of the interface post. One of the rail-shaped projections extends generally parallel to the mounting panel at a location between the mounting panel and the interface post, while another of the rail-shaped projections extends generally parallel to the mounting panel at a location on an opposite side of the interface post from the first of the rail-shaped projections. The pair of elongated rail-shaped projections are configured to engage with additional portions of the power hand tool to further align and stabilize the power hand tool in position on the support panel when the power hand tool is engaged with the support rack. For example, the pair of elongated rail-shaped projections are positioned on the support panel adjacent where snap-release coupling members are located on the power hand tool, the snap-release coupling members designed for removable engagement with similar coupling members on the battery pack designed to engage with the power hand tool.

In a different embodiment, the projecting structure includes a T-shaped rail projection with a stem portion, which connects to and extends upwardly from the upper surface of the support panel, and a top portion that is generally planar and projects laterally beyond at least two side edges of the stem portion such that the top portion has a greater width than that of the stem portion. The T-shaped rail projection is shaped and sized to frictionally engage and fit within a receptacle slot on the power hand tool. The T-shaped rail projection closely simulates the shape and size of a battery interface on a battery pack designed to engage with the receptacle slot of the power hand tool. The T-shaped rail projection may further include an end wall connected to each of the stem portion and the top portion. This end wall has a width consistent with the width of the top portion such that opposing slots defined underneath the top portion where it projects laterally beyond the stem portion are terminated by the end wall.

In a second set of embodiments, a method is provided for manufacturing a support rack for hanging a power hand tool on a wall surface. The method includes conducting additive manufacturing or injection molding to produce the support rack as an integral and unitary one-piece construction. The step of conducting is further defined by: forming a mounting panel, forming a support panel, and forming at least one projecting structure. The mounting panel is configured to be positioned in engagement with the wall surface, and the mounting panel includes at least one fastener aperture sized to receive a fastening element that removably couples the mounting panel to the wall surface. The support panel connects to and extends transversely away from the mounting panel, with the support panel having an upper surface and a lower surface. The projecting structure extends transversely and upwardly from the upper surface of the support panel. The projecting structure is customized in shape and size to releasably engage in a frictional fit with at least one corresponding interface aperture provided on the power hand tool. The support rack includes no metallic or conductive components configured to provide power or electrical charging to the power hand tool.

In one such embodiment, the projecting structure is made by forming an interface post and forming a pair of elongated rail-shaped projections. The interface post extends upwardly from the support panel and includes a shaped periphery sized to frictionally engage and fit within a receptacle aperture on the power hand tool. The rail-shaped projections have a lesser height than that of the interface post, with both of the rail-shaped projections extending generally parallel to the mounting panel, with one on each opposite side of the interface post. The rail-shaped projections are configured to engage with additional portions of the power hand tool, such as for aligning and stabilizing the tool on the support rack.

In another such embodiment, the projecting structure is made by forming a T-shaped rail projection with a stem portion and a top portion. The stem portion connects to and extends upwardly from the upper surface of the support panel. The top portion is generally planar and projects laterally beyond at least two side edges of the stem portion. The T-shaped rail projection is shaped and sized to frictionally engage and fit within a receptacle slot on the power hand tool.

In a third set of embodiments, a method is provided for manufacturing a support rack for hanging a battery pack on a wall surface. The method includes conducting additive manufacturing or injection molding to produce the support rack as an integral and unitary one-piece construction. The step of conducting is further defined by: forming a mounting panel, forming a support element, and forming at least one battery aperture or battery slot. The mounting panel is configured to be positioned in engagement with the wall surface, and the mounting panel includes at least one fastener aperture sized to receive a fastening element that removably couples the mounting panel to the wall surface. The support element connects to and extends outwardly away from the mounting panel, with the support element having an upper surface and a lower surface. The battery aperture or slot extends into the support element from the upper surface thereof and towards the lower surface thereof. Each battery aperture or battery slot is customized in shape and size to releasably engage in a frictional fit with at least one corresponding interface element provided on the battery pack. The support rack includes no metallic or conductive components configured to provide power or electrical charging to the battery pack.

In one such embodiment, the support element is a support panel that is generally planar in shape and extends outwardly at an oblique angle from the mounting panel. The support panel includes two or more battery apertures in side-by-side relationship. Each of the battery apertures extends through the support panel from the upper surface to the lower surface such that a projecting portion of the battery pack is insertable through the battery apertures to provide physical support for the battery pack at the support rack.

In another such embodiment, the support element includes a series of support lugs each extending outwardly and perpendicularly from the mounting panel. The support lugs are spaced apart laterally from one another along a length of the support rack so as to define front openings of two or more of the battery slots, such slots being defined between each adjacent pair of support lugs. Each of the battery slots extends vertically in the support element from the upper surface thereof such that a rail-like interface element of the battery pack is slidable into the battery slot to provide physical support for the battery pack at the support rack.

It will be understood that the various embodiments described above can be combined in any combination or sub-combination, without departing from the scope of the invention.

BRIEF DESCRIPTION OF THE DRAWINGS

The accompanying drawings, which are incorporated in and constitute a part of this specification, illustrate one or more embodiments of the invention and, together with a general description of the invention given above, and the detailed description given below, serve to explain the invention.

DETAILED DESCRIPTION

Various embodiments of a support rack for retaining power hand tools and/or associated battery packs are shown at FIGS. 1-7 and described in detail below. The support racks allow for a cost-efficient and simplified method of manufacturing, while also providing secure and reliable support for organizing power hand tools and/or battery packs along any surface, particularly wall surfaces. To this end, the support racks are advantageously formed with no metallic or conductive components configured to provide power or electrical charging, which helps simplify the construction and reduce the likelihood of failures in use. Each support rack may be custom-tailored for particular manufacturers or brands so that the correct battery pack or power hand tool can be located and accessed on demand by tool users. As a result, the support racks and methods described herein improve organization and storage for all tool users, whether in commercial settings or for personal household use.

Figure 1:
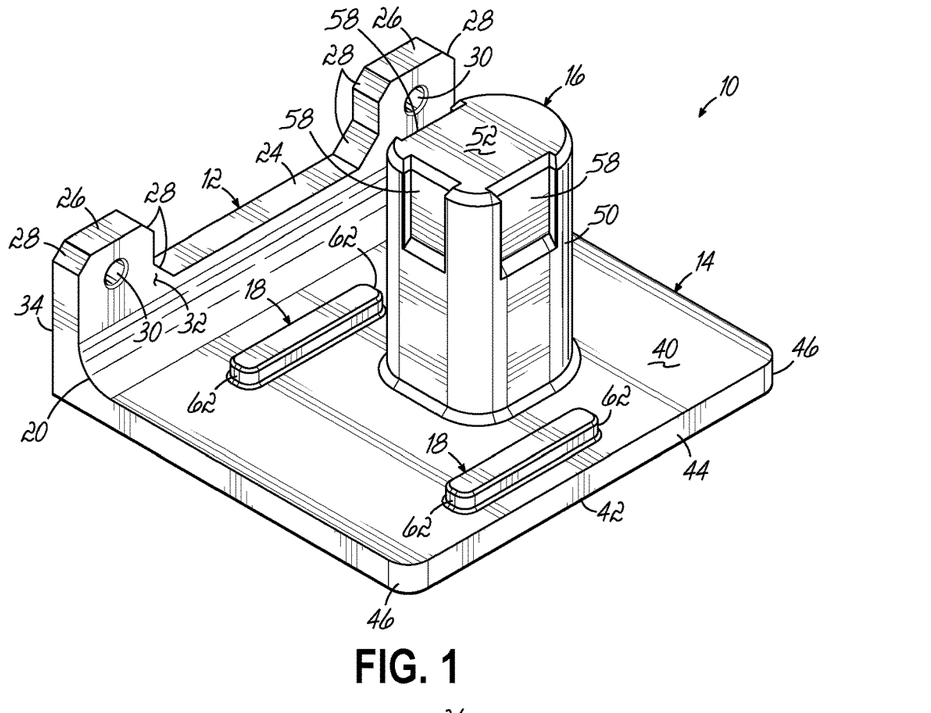
FIG. 1 is a top left perspective view of a tool support rack in accordance with one embodiment of the present invention, the support rack including an interface post.
Figure 2:
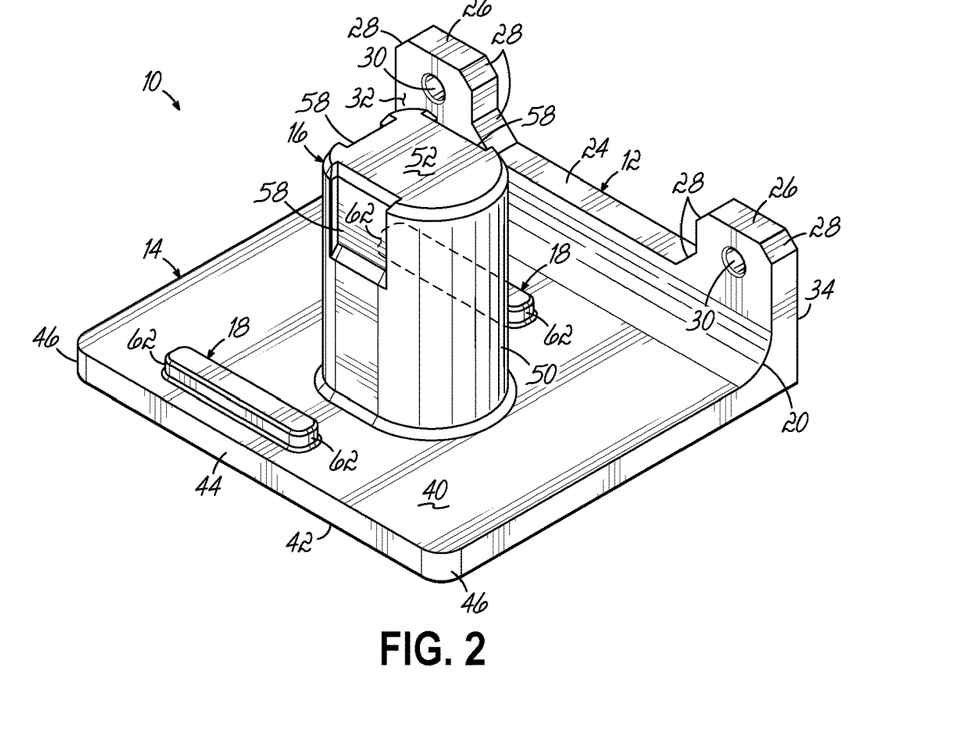
FIG. 2 is a top right perspective view of the tool support rack of FIG. 1.
Figure 3:
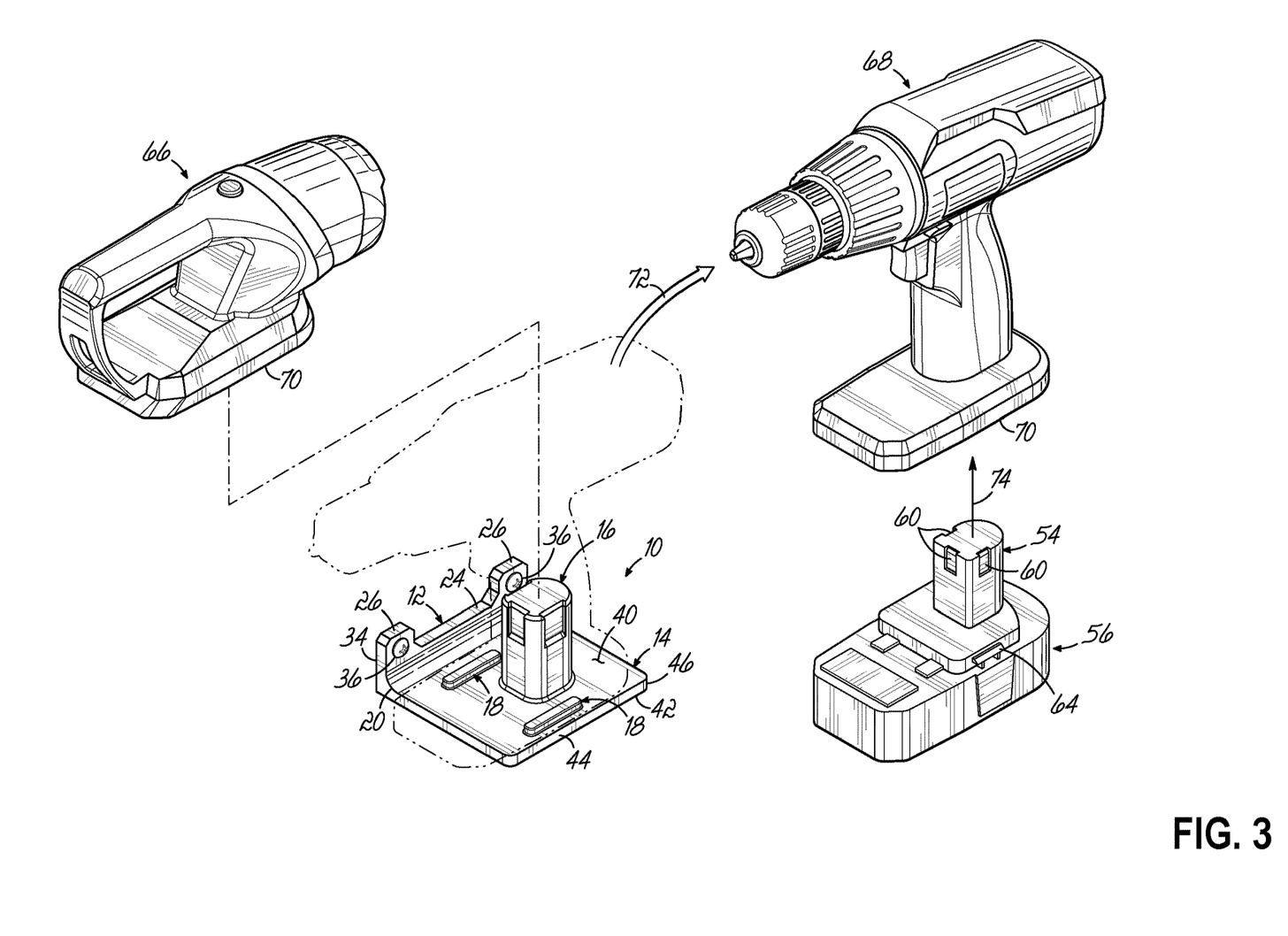
FIG. 3 is a perspective view schematically showing various uses of the tool support rack of FIG. 1 when mounted on a wall surface, with multiple power hand tools shown for illustrative purposes in this regard.

With reference to FIGS. 1-3, a first embodiment of a tool support rack 10 is shown in detail. The tool support rack 10 is configured to provide a reliable physical support for a power hand tool as will be explained in further detail below. The tool support rack 10 includes a mounting panel 12, a support panel 14 connected to and extending transversely outward from the mounting panel 12, and at least one projecting structure extending upwardly from the support panel 14. In this embodiment, the projecting structure is defined by an interface post 16 and a pair of elongated rail-shaped projections 18 on opposite sides of the interface post 16. The tool support rack 10 is therefore configured to releasably engage in a frictional fit with at least one corresponding interface aperture or slot provided on one or more power hand tools. Each power hand tool may have a similar interface for engaging with the battery packs used with that type of power hand tool, but it will be appreciated that the tool support rack 10 engages with and supports only one power hand tool at a time in this embodiment.

The mounting panel 12 and the support panel 14 collectively define an L-shaped configuration when viewed from the side in this embodiment, as is evident in FIGS. 1 and 2. This L-shaped configuration is a result of both the mounting panel 12 and the support panel 14 being formed as a planar panel, with the panels 12, 14 being generally perpendicular to one another. To help avoid a stress concentration point when manufacturing the tool support rack 10, such as by additive manufacturing methods like 3D printing or injection molding, the interior junction 20 between the panels 12, 14 is formed as a curved transition portion.

With reference to the mounting panel 12, the planar panel defines a U-shaped construction including a main wall portion 24 that extends along an entirety of the width of the mounting panel 12 and two mounting tabs 26 that project vertically above the main wall portion 24 on opposite ends of the width the mounting panel 12. Each of the mounting tabs 26 is generally rectangular in shape but includes corner chamfers 28 both at the upper corners thereof as well as at the lower corner defining a transition junction with the top end of the main wall portion 24. As such, the mounting tabs 26 provide a smoothened upper periphery and ornamental appearance for the mounting panel 12, which further enhances the U-shaped construction thereof. Each of the mounting tabs 26 extends with a height in this embodiment about the same height, or slightly less than, the height of the main wall portion 24, although it will be understood that the relative shape and sizes of these elements of the mounting panel 12 may be modified in other embodiments. Likewise, the mounting panel 12 may be formed with more than two mounting tabs 26 in further embodiments of the support rack 10, such as ones that are larger in size than this illustrated embodiment for supporting larger power hand tools. Each of the mounting tabs 26 includes a fastener aperture 30 formed as a cylindrical bore through the thickness of the mounting panel 12, e.g., from a front surface 32 of the mounting panel 12 through to the back surface 34 thereof. Each fastener aperture 30 is sized to receive a fastening element 36 (see FIG. 3) such as a screw or wall anchor that removably couples the mounting panel 12 to a wall surface.

To this end, when the tool support rack 10 of this embodiment is installed on a wall surface (not shown), the back surface 34 of the mounting panel 12 is positioned in abutting parallel contact with the wall surface in the desired location, and then the fastening elements 36 secure the tool support rack 10 in position on the wall surface. This configuration permits the tool support rack 10 to be securely attached to the wall surface but also removable, in the event a reconfiguration or reorganization of the tool and battery storage space is desired by the end user. Such reconfiguration may become desirable if the set of power hand tools that are to be stored on the tool support rack 10 vary in size and shape and therefore require more room around the tool support rack 10 when in use on the wall surface. In the secured configuration along the wall surface, the front surface 32 and the curved interior junction 20 between the panels 12, 14 faces outwardly towards the support panel 14 and towards the projecting structure(s) on that support panel 14.

Now turning to the support panel 14, the planar panel construction of the support panel 14 defines an upper surface 40, a lower surface 42, and a peripheral edge 44 extending between the upper surface 40 and lower surface 42. The support panel 14 defines a generally square or rectilinear shape, which results in the peripheral edge including a couple of front corner portions 46 which in this embodiment are rounded so as to avoid stress concentrations during manufacturing and also avoid sharp corner edges at a leading end of the tool support rack 10. The support panel 14 thus defines a width concurrent with the width of the mounting panel 12 in this embodiment, which positions the fastening elements 36 in the mounting tabs 26 for evenly supporting an entirety of the tool support rack 10 and any power hand tool mounted thereon as described in examples below. When the mounting panel 12 is secured along a generally vertical wall surface, the support panel 14 is oriented generally horizontally, and it is with this frame of reference that the upper surface 40 and the lower surface 42 are labeled in this description.

The interface post 16 and the rail-shaped projections 18 extend generally transversely upward from the upper surface 40 of support panel 14. In this embodiment, the interface post 16 defines a shaped periphery 50 that is sized to frictionally engage and fit within a receptacle aperture on a power hand tool. The shaped periphery 50 in FIGS. 1 and 2 generally includes three planar sidewalls and a fourth convex rounded sidewall, each of which extend up to a top end 52 of the interface post 16. More specifically, the illustrated version of the interface post 16 has a shaped periphery 50 designed with a similar shape and size as the charging terminal projection 54 location on rechargeable 18V battery packs 56 (see FIG. 3), such as those commercially available from Ryobi Seisakusho Co., Ltd., of Japan. It will be appreciated that the particular shape and size of the interface post 16 may be reconfigured in other embodiments of the invention so that different types of power hand tools may be supported on the tool support rack 10.

With continued reference to FIGS. 1 and 2, the shaped periphery 50 of the interface post 16 remains generally consistent along a height of the interface post 16, with one exception. Adjacent the top end 52, e.g., along an upper free end of interface post 16, the three planar sidewalls of the shaped periphery 50 further include cutaway slots 58 that simulate the shape and position of charging terminals 60 that are present on the charging terminal projection 54 of the battery pack 56. The specific size and arrangement of such cutaway slots 58 may be modified in other embodiments so as to closely simulate or match different interfaces of other battery packs and other tool manufacturers. In all embodiments, the interface post 16 is specifically formed to engage in a close frictional fit with the power hand tool in order to reliably secure the power hand tool in position on the support panel 14.

The elongated rail-shaped projections 18 are also shown in further detail in FIGS. 1 and 2 for this embodiment. Each of the rail-shaped projections 18 defines a shorter height than the height of the interface post 16, and more specifically, a shorter height than the height of the mounting panel 12 as well. The rail-shaped projections 18 extend generally linearly between opposing rounded ends 62. Both of the rail-shaped projections 18 extend along this linear path generally parallel to the mounting panel 12, which results in the rounded ends 62 facing towards the lateral sides on opposite ends of the width of the support panel 14. One of the rounded ends 62 for the rail-shaped projections 18 is located in a concurrent position as the interface post 16 along a lateral width of the support panel 14, and more specifically, this rounded end 62 terminates at about a center of the width of the interface post 16. The opposite of the rounded ends 62 on both rail-shaped projections 18 is thus closer to one lateral side of the support panel 14 and located away from the interface post 16 such that the rail-shaped projections 18 effectively bracket and then extend away from the interface post 16, the latter being located generally centrally (or slightly offset from center) on the support panel 14. One of the rail-shaped projections 18 is located between the interface post 16 and the mounting panel 12, so as to be generally behind the interface post 16 when looking at the tool support rack 10 from a front end thereof, and another of the rail-shaped projections 18 is located on an opposite side of the interface post 16 closer to the front end of the support panel 14.

In the illustrated embodiment, which as noted above is designed for tools made by the Ryobi company in this example, the pair of elongated rail-shaped projections 18 are configured with a shape and size for engaging additional portions of the power hand tool. For example, the rail-shaped projections 18 are positioned on the support panel 14 adjacent where snap-release coupling members 64 are located on the power hand tool [not visible in the Figures] and on the corresponding removable battery pack 56 (again, see FIG. 3). The snap-release coupling members 64 and the rail-shaped projections 18 therefore removably engage with the same interface structures on the power hand tool. This engagement with the rail-shaped projections 18 when on the tool support rack 10 is designed to further align and stabilize the power hand tool in position on the tool support rack 10. The rail-shaped projections 18 may be reshaped, repositioned, or omitted altogether in other embodiments of the support rack, but when present, these rail-shaped projections 18 assist with making a more reliable and consistent physical support of the power hand tool on the tool support rack 10.

The tool support rack 10 as shown in FIGS. 1-3 may be made by a method of manufacture in accordance with further embodiments of the invention. The method of manufacture includes conducting at least one of additive manufacturing (e.g., 3D printing) or injection molding to produce the tool support rack 10 with all of the elements described above, including the mounting panel 12, the support panel 14, and the at least one projecting structure on top of the support panel 14. In both these types of forming, the tool support rack 10 is advantageously formed from and consists of a plastic material, which is lightweight but strong enough to support various power hand tools. To this end, the desirable strength of the tool support rack 10 is in part a result of forming all of the elements of the tool support rack 10 integrally as a unitary piece from the plastic material, and in part from forming the mounting panel 12 and the support panel 14 with a sufficient size and thickness that will support a full weight of the power hand tool when such tool is engaged with the at least one projecting structure. With each line or manufacturer typically using a consistent battery pack design for supporting a plurality of different power hand tools, the mold for injection molding and the plans for 3D printing only require modification to adjust the shape and size of the at least one projecting structure to accommodate and produce tool support racks 10 of different embodiments for different types and makers of tools and battery packs. For strength and manufacturing speed and reliability, injection molding is preferred, but these and other similar types of manufacturing are possible for performing this step of the method of manufacture.

As described above, the forming of the tool support rack 10 to consist of just the plastic material also advantageously results in the tool support rack 10 having no metallic or conductive components, which would significantly increase cost and complexity to manufacture, while also requiring separate connection of the rack to an external power supply, which may not always be possible or desirable when organizing and storing/supporting tools. The tool support rack 10 of this invention allows for custom-tailored supports and organization to be applied in many different household and commercial settings, which thereby improves the practices of users of these sets of power hand tools. Moreover, the close frictional fit provided for power hand tools allows better physical support and higher reliability and predictability for users, effectively presenting a superior option for storage of power hand tools as compared to any conventional designs.

Now with reference to FIG. 3, one potential use of the tool support rack 10 of the previously-described and illustrated embodiment is shown in further detail. To this end, the user may own various power hand tools that are configured to be powered by the same battery pack 56, the specific examples shown including a mobile flashlight 66 and a cordless drill 68. Each of the power hand tools 66, 68 includes a battery interface 70 which is shown along a bottom of these power hand tools 66, 68, the battery interface 70 including a receptacle aperture and/or snap-release coupling members as noted above. As a result, when a user is done with the flashlight 66 and needs to begin work with the cordless drill 68, the cordless drill 68 can be disengaged from the storage position on the tool support rack 10 (shown by phantom lines in FIG. 3 and movement arrow 72), and then moved as shown by arrow 74 to engage with the battery pack 56, which may have been previously removed from the flashlight 66. With the tool support rack 10 now opened up again and available, the flashlight 66 can be engaged with the interface post 16 and rail-shaped projections 18 to secure the flashlight 66 in position at the tool support rack 10. The flashlight 66 is protected from accidental damages and positioned to be ready for the next time the user needs this tool. Accordingly, the tool support rack 10 may be used to provide physical support to any one of a number of different power hand tools, as the need arises and as the user desires at that time.

Figure 4:
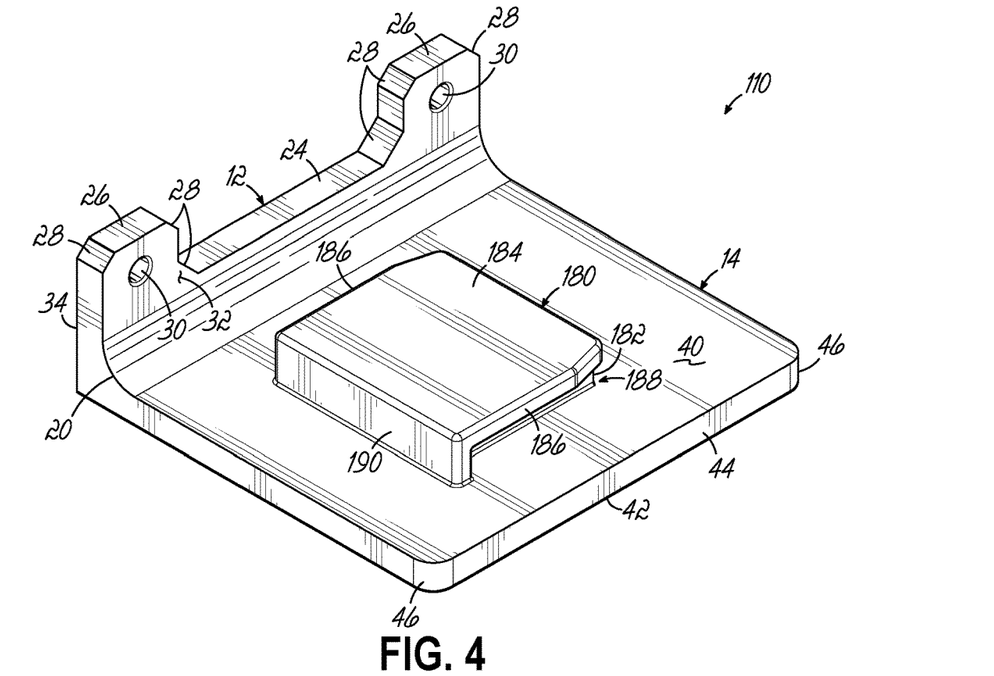
FIG. 4 is a top left perspective view of a tool support rack in accordance with another embodiment of the present invention, the support rack including a T-shaped rail projection.
Figure 5:
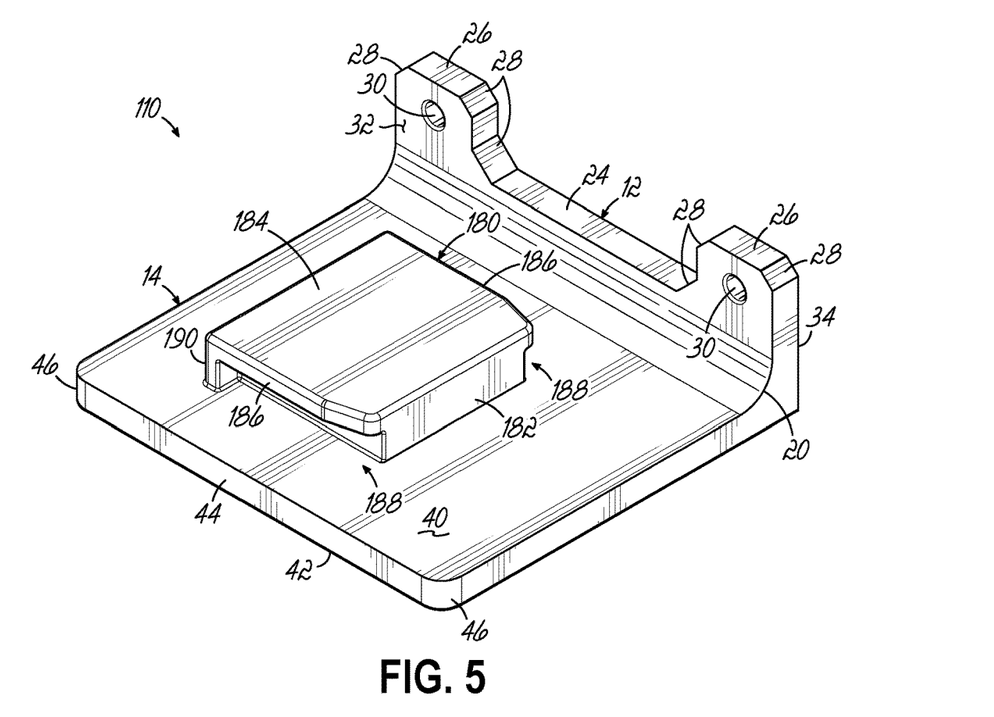
FIG. 5 is a top right perspective view of the tool support rack of FIG. 4.

FIGS. 4 and 5 illustrate an alternative embodiment of the tool support rack 110, this tool support rack 110 being similar in many elements and manners as the previously described embodiment. To this end, the same reference numbers including 12, 14 are used on elements such as the mounting panel 12 and the support panel 14 where those elements are unchanged from the prior embodiment, for the sake of description efficiency. The tool support rack 110 of this embodiment includes a different type of projecting structure extending upwardly from the support panel 14. In this particular example, the projecting structure is designed to interface with power hand tools in the same manner as the connection/charging interface on rechargeable 20V battery packs, such as those commercially available from Dewalt Industrial Tool Co., of Maryland.

More particularly, the projecting structure of this embodiment includes a T-shaped rail projection 180 extending upwardly from about a center of the support panel 14. The T-shaped rail projection 180 is defined by a stem portion 182 and a top portion 184. The stem portion 182 connects to and extends from the upper surface 40 of support panel 14. The top portion 184 is generally planar and extends so as to project laterally beyond the corresponding sides of the stem portion 182 adjacent at least two side edges 186 defined by the top portion 184. As shown in FIGS. 4 and 5, these side edges 186 may be the front-facing and rear-facing side edges 186 of the top portion 184, such that the general T-shaped construction of the rail projection 180 is most clearly visible from the side of the tool support rack 110. The top portion 184 along the side edges 186 and the stem portion 182 collectively define opposing slots 188 that extend along a width of the T-shaped rail projection 180, specifically along the opposite sides of the T-shape. The corners of the top portion 184 may taper slightly over the open end of the opposing slots 188 as shown. The opposing slots 188 are sized and shaped to be configured for engagement with a receptacle slot defining a battery interface on a power hand tool (which in this illustrated example would be a tool that works with 20V Dewalt battery packs).

The T-shaped rail projection 180 of this embodiment includes additional features. To this end, the rail projection 180 further includes an end wall 190 connected to each of the stem portion 182 and to the top portion 184. The end wall 190 has a length consistent with the top portion 184 and therefore also projects over one end of the opposing slots 188, shown along the left side of the rail projection 180 in FIGS. 4 and 5. As such, the T-shaped rail projection 180 of this embodiment "opens" towards a right side of the tool support rack 110, but it will be understood that the end wall 190 could be repositioned to different sides such that a power hand tool is slid onto the T-shaped rail projection 180 in different directions in similar alternative embodiments. In its entirety, the T-shaped rail projection 180 closely simulates the shape and size of a battery interface on a battery pack designed to engage with the receptacle slot on one or more power hand tools, which results in the power hand tools being engagable in a close frictional fit with the T-shaped rail projection 180 to physically support the power hand tool on the tool support rack 110 of this embodiment. In corresponding methods of manufacture, the rail projection 180 is formed integrally as a unitary piece of the same plastic material as the mounting panel 12 and as the support panel 14, thereby functioning in an identical manner as the previously-described embodiment. Also as described above, these illustrated embodiments are just two specific examples showing the variations possible for the at least one projecting structure provided atop the support panel 14 of the tool support racks 10, 110, and further embodiments custom-tailored for other brands or lines of power hand tools can achieve the same technical benefits in other embodiments of the present invention.

Figure 6:
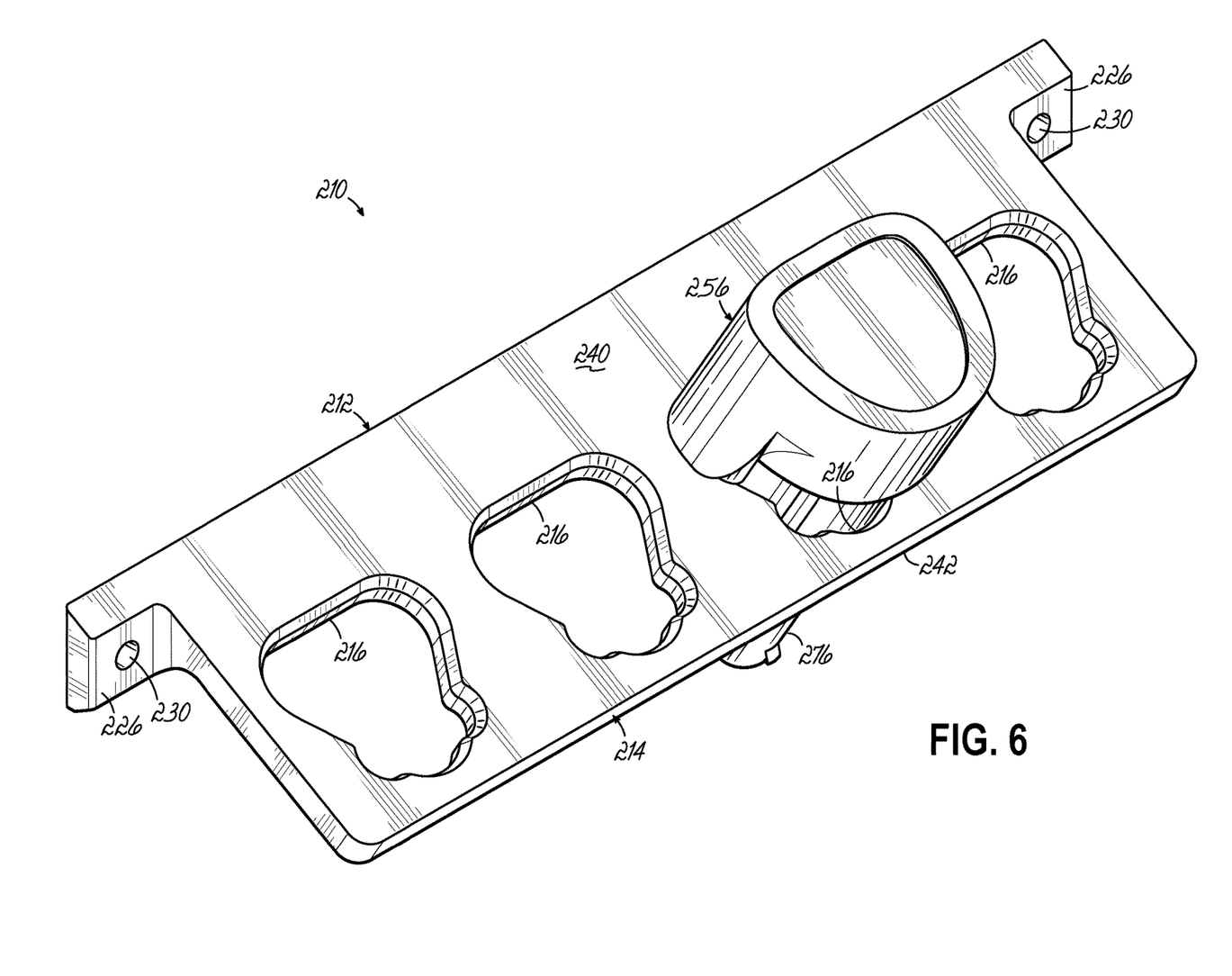
FIG. 6 is a top perspective view of a battery support rack in accordance with yet another embodiment of the present invention, the support rack including a series of battery apertures with one exemplary battery pack inserted into engagement with one of the battery apertures.
Figure 7:
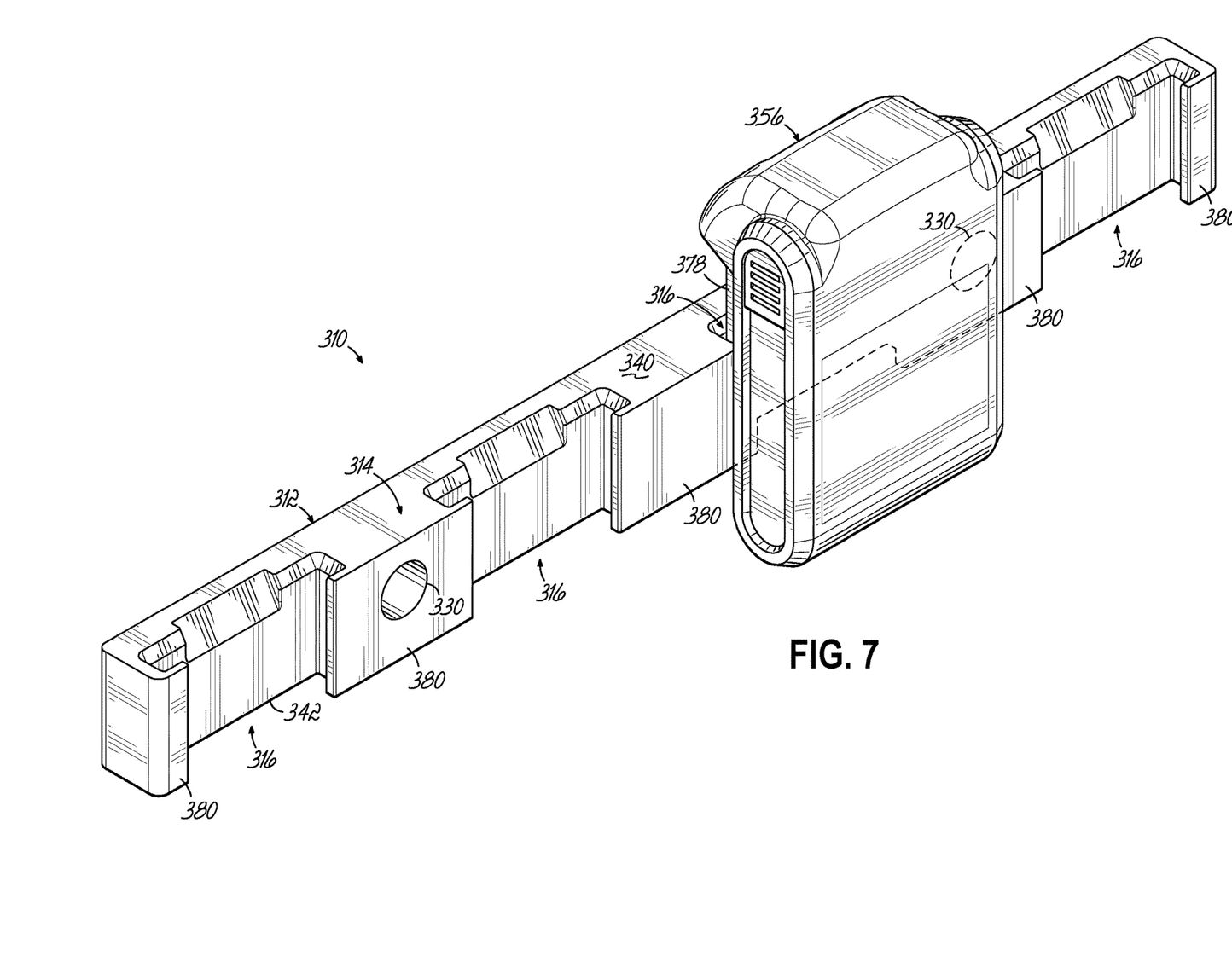
FIG. 7 is a top perspective view of a battery support rack in accordance with a further embodiment of the present invention, the support rack including a series of battery slots with one exemplary battery pack slid into engagement with one of the battery slots.

Support racks in accordance with the embodiments of this invention may also be reconfigured to physically support a plurality of rechargeable battery packs along the wall surface. Two specific examples of alternative embodiments of the support rack are shown in FIGS. 6 and 7. In many respects, these support racks have similar elements and construction methods as the above-described tool support racks 10, 110. However, a brief description of these alternatives follows to explain the differences, where present.

The support rack 210 shown in FIG. 6 is designed for battery packs 256 having interface post charging projections 276 such as those used with 18V tools commercially available from the Ryobi company, but as with prior embodiments, the support rack 210 is custom-tailored to any specific type or line of battery pack 256 desired for organization and storage. The support rack 210 is an angled battery rack which includes a mounting panel 212 that is configured to be positioned in engagement with the wall surface, a support panel 214 that is generally planar in shape and extends outwardly at an oblique angle from the mounting panel 212, and a plurality of battery apertures 216 that are formed in side-by-side relationship along a width of the support panel 214. Each of the battery apertures 216 extends through the support panel 214 completely, e.g., from the upper surface 240 thereof through the lower surface 242 thereof. Moreover, each battery aperture 216 is sized and shaped to releasably engage in a close frictional fit with the corresponding interface element on the battery pack 256, which as noted above is an interface post charging projection 276 in this illustrated embodiment.

Although only one battery pack 256 is shown at the support rack 210 in FIG. 6, it will be readily understood that a series of battery packs 256 can be stored in side-by-side relationship by inserting the interface post charging projections 276 into frictional fits with the battery apertures 216 on the support panel 214. As with previous embodiments, the mounting panel 212 includes fastener apertures 230 (specifically, at tabs 226 that project beyond each side edge of the support panel 214) such that the support rack 210 can be mounted along a wall surface, and when this mounting is done, the oblique angling of the support rack 210 presents each of the battery packs 256 in a position that is easy to access for users when a battery pack 256 in the support rack 210 is needed for use with a power hand tool. The elements of the support rack 210 are again formed with rounded corners, junctions, and chamfers to provide a smooth ornamental appearance without any sharp corners that would be stress concentration points or potential points for users to catch themselves or tools upon. Just like the previously-described embodiments, the support rack 210 is advantageously formed by additive manufacturing or injection molding from a plastic material (and integrally formed as a unitary piece for the necessary strength and reliability desired), so as to not include any metallic or conductive components for providing power or charging to the battery packs. Thus, the support rack 210 is configured to provide physical support and organization only for the battery pack(s) 256. In similar alternative embodiments, the size and shape of the battery apertures 216 is modified to receive the interface elements of different styles of battery packs.

Now turning to FIG. 7, the support rack 310 shown in this embodiment is designed for battery packs 356 having charging interfaces in the form of rail-shaped projections 378 such as those used with 12V tools commercially available from Milwaukee Electric Tool Corp., of Wisconsin, but as with prior embodiments, the support rack 310 is custom-tailored to any specific type or line of battery pack 356 having various rail projections that would be desired for organization and storage. The support rack 310 is a vertical slot battery rack which includes a mounting panel 312 that is configured to be positioned in engagement with the wall surface, a support element 314 defined by a series of support lugs 380 that each extend outwardly and perpendicular from the mounting panel 312, and a plurality of battery slots 316 that are formed in side-by-side relationship between adjacent pairs of the support lugs 380. Each of the battery slots 316 in the support rack 310 of this embodiment extends from a top surface 340 of the support rack 310 and through a bottom surface 342 of the support rack 310, which advantageously allows for battery packs 356 to be stored in a manner relatively centered on the height of the support rack 310 (e.g., the battery pack 356 when stored projects a similar amount above the top surface 340 and below the bottom surface 342 thereof). Moreover, each battery slot 316 is sized and shaped to releasably engage in a close frictional fit with the corresponding interface element on the battery pack 356, which as noted above is a rail projection 378 in this illustrated embodiment.

Though only one battery pack 356 is shown at the support rack 310 in FIG. 7, it will be readily understood that a series of battery packs 356 can be stored in side-by-side relationship by inserting the rail projections 378 into frictional fits with the battery slots 316. As with previous embodiments, the mounting panel 312 includes fastener apertures 330 (specifically in this embodiment, also extending through to a front of selected ones of the support lugs 380 as well) such that the support rack 310 can be mounted along a wall surface. It will be appreciated that the fastener apertures 330 can be repositioned such as to be behind one or more of the battery slots 316 rather than through the support lugs 380 in other embodiments of this invention. The elements of the support rack 310 are again formed with rounded corners, junctions, and chamfers to provide a smooth ornamental appearance without any sharp corners that would be stress concentration points or potential points for users to catch themselves or tools upon. Just like the previously-described embodiments, the support rack 310 is advantageously formed by additive manufacturing or injection molding from a plastic material (and integrally formed as a unitary piece for the necessary strength and reliability desired), so as to not include any metallic or conductive components for providing power or charging to the battery packs. Thus, the support rack 310 is configured to provide physical support and organization only for the battery pack(s) 356 of this general type. And like before, only the specific size and shape profiles of the vertical battery slots 356 (and the support lugs 380 defining same) need to be modified in similar alternative embodiments that work with other brands or lines of battery packs.

In all embodiments of the support rack of the present invention including those described in detail in this section, a physical support is provided for a power hand tool or one or more battery packs so that these can be organized and supported along a vertical wall surface. The simplified manufacturing methods provide for cost-efficiency while also achieving strength and reliability for the support racks, and custom-tailoring the support racks for different styles of battery/tool interfaces can also be done. Thus, owners and operators of power hand tools and their battery packs can better organize and access these items when needed, while reducing the likelihood of accidental damages and misplacement of tools and battery packs. The support racks of this invention allow for secure physical storage of both power hand tools and battery packs, thereby improving the options available in the field.

While the invention has been illustrated by a description of various embodiments, and while these embodiments have been described in considerable detail, it is not the intention of the Applicant to restrict or in any way limit the scope of the appended claims to such detail. Additional advantages and modifications will readily appear to those skilled in the art. The invention in its broader aspects is therefore not limited to the specific details, representative apparatus and methods, and illustrative examples shown and described. Accordingly, departures may be made from such details without departing from the scope of the Applicant's general inventive concept.

What is claimed is:

1. A method of manufacturing a support rack for hanging at least one battery pack on a wall surface, the method comprising:
    forming the support rack as an integral and unitary one-piece construction, wherein this step of forming further comprises:
        forming a mounting element that is configured to be positioned in engagement with the wall surface, the mounting element including at least one fastener aperture sized to receive a fastening element that removably couples the mounting element to the wall surface;
        forming a support element that is connected to and extends outwardly away from the mounting element when the mounting element is connected to the wall surface, the support element including an upper surface and a lower surface; and
        forming a plurality of battery receptacles arranged in side-by-side relationship along a width of the support element, with each of the battery receptacles extending from the upper surface thereof and to the lower surface thereof,
    wherein each of the battery receptacles is shaped and sized to releasably engage in a frictional fit with at least one corresponding interface element provided on a battery pack, and wherein each of the plurality of battery receptacles is formed to define a non-circular peripheral shape when viewed from above the support element, with each of the battery receptacles also being formed to be identical in shape and size to all other battery receptacles on the support element.

2. The method of claim 1, wherein the support element is a support panel that is generally planar in shape and extends outwardly at an oblique angle from the mounting element, such that each battery pack inserted into one of the plurality of battery receptacles is held at an angle from a vertical orientation, thereby presenting each battery pack for ready access by a user.

3. The method of claim 1, wherein the step of forming the support rack further comprises:
    conducting injection molding or additive manufacturing using a plastic material to make the mounting element, the support element, and the plurality of battery receptacles, to thereby define the integral and unitary one-piece construction.

4. The method of claim 3, wherein the support rack includes no conductive components configured to provide power or electrical charging to the at least one battery pack, such that the support rack provides only a physical support for the at least one battery pack on the wall surface.

5. The method of claim 1, wherein the step of forming a plurality of battery receptacles further comprises:
    forming each of the battery receptacles as a battery aperture extending through the support element, the battery aperture defining an outer periphery shaped to frictionally receive an interface post charging projection defining the interface element on the battery pack.

6. The method of claim 5, wherein the step of forming a plurality of battery receptacles further comprises:
    positioning the plurality of battery apertures to be spaced apart from one another on the support element to allow a gap or spacing to be present between adjacent battery packs after engagement through an adjacent pair of the battery apertures.

7. The method of claim 6, wherein each edge and corner defined by the support element and the mounting element is formed to be at least one of rounded and chamfered to avoid presenting sharp corners and junctions that could catch on users or battery packs.

8. The method of claim 5, wherein the mounting element includes a plurality of fastener apertures spaced apart from one another and spaced apart from the support element, such that fastening elements located at the plurality of fastener apertures remain accessible regardless of whether battery packs are engaged with the plurality of battery apertures.

9. A support rack for retaining at least one battery pack on a wall surface, the support rack comprising:
    a mounting element configured to be positioned in engagement with the wall surface, the mounting element including at least one fastener aperture sized to receive a fastening element that removably couples the mounting element to the wall surface;
    a support element connected to and extending outwardly from the mounting element, the support element including an upper surface and a lower surface; and
    a plurality of battery receptacles arranged in side-by-side relationship along a width of the support element, with each of the battery receptacles extending from the upper surface thereof and to the lower surface thereof,
    wherein each of the battery receptacles is shaped and sized customized in shape and size to releasably engage in a frictional fit with at least one corresponding interface element provided on a battery pack, and wherein the mounting element and support element are formed as an integral and unitary one-piece construction, and wherein each of the plurality of battery receptacles defines a non-circular peripheral shape when viewed from above the support element, with each of the battery receptacles also being identical in shape and size to all other battery receptacles on the support element.

10. The support rack of claim 9, wherein the mounting element and support element are injection molded or formed by additive manufacturing using a plastic material, to thereby define the integral and unitary one-piece construction.

11. The support rack of claim 10, wherein the support rack includes no conductive components configured to provide power or electrical charging to the at least one battery pack, such that the support rack provides only a physical support for the at least one battery pack on the wall surface.

12. The support rack of claim 9, wherein each of the battery receptacles is a battery aperture extending through the support element, the battery aperture defining an outer periphery shaped to frictionally receive an interface post charging projection defining the interface element on the battery pack.

13. The support rack of claim 12, wherein the plurality of battery apertures are spaced apart from one another on the support element to allow a gap or spacing to be present between adjacent battery packs after engagement through an adjacent pair of the battery apertures.

14. The support rack of claim 13, wherein the support element is a support panel that is generally planar in shape and extends at an oblique angle from the mounting element, such that each battery pack inserted into one of the plurality of battery apertures is held at an angle from a vertical orientation, thereby presenting each battery pack for ready access by a user.

15. The support rack of claim 14, wherein each edge and corner defined by the support panel and the mounting element is at least one of rounded and chamfered to avoid presenting sharp corners and junctions that could catch on users or battery packs.

16. The support rack of claim 12, wherein the mounting element includes a plurality of fastener apertures spaced apart from one another and spaced apart from the support element, such that fastening elements located at the plurality of fastener apertures remain accessible regardless of whether battery packs are engaged with the plurality of battery apertures.

17. The support rack of claim 14, wherein the mounting element includes two opposing tabs that project laterally outwardly beyond side edges of the support panel, with one fastener aperture located through each of these opposing tabs.

18. A support rack for retaining at least one battery pack on a wall surface, the support rack comprising:
   a mounting element configured to be positioned in engagement with the wall surface, the mounting element including at least one fastener aperture sized to receive a fastening element that removably couples the mounting element to the wall surface;
   a support element connected to and extending outwardly from the mounting element, the support element including an upper surface and a lower surface; and
   a plurality of battery receptacles arranged in side-by-side relationship along a width of the support element, with each of the battery receptacles extending from the upper surface thereof and to the lower surface thereof,
   wherein each of the battery receptacles is shaped and sized to releasably engage in a frictional fit with at least one corresponding interface element provided on a battery pack, and wherein the mounting element and support element are formed as an integral and unitary one-piece construction,
   wherein the support element is a support panel that is generally planar in shape and extends at an oblique angle from the mounting element, such that each battery pack inserted into one of the plurality of battery receptacles is held at an angle from a vertical orientation, thereby presenting each battery pack for ready access by a user, and
   wherein the support rack includes no structure extending below the battery receptacles from the lower surface of the support element, such that a portion of each battery pack inserted through the battery receptacles extends into open space located below the support rack.

\* \* \* \* \*

UNITED STATES PATENT AND TRADEMARK OFFICE
CERTIFICATE OF CORRECTION

| | | |
|---|---|---|
| PATENT NO. | : 11,826,896 B2 | Page 1 of 1 |
| APPLICATION NO. | : 17/550645 | |
| DATED | : November 28, 2023 | |
| INVENTOR(S) | : Matthias Keller | |

It is certified that error appears in the above-identified patent and that said Letters Patent is hereby corrected as shown below:

In the Claims

Column 14, Claim 9, Line 34, reads "sized customized in shape and size to releasably engage" and should read -- sized to releasably engage --.

Signed and Sealed this
Sixth Day of February, 2024

Katherine Kelly Vidal
*Director of the United States Patent and Trademark Office*